H. H. C. ARNOLD.
Animal-Trap.

No. 165,526.  Patented July 13, 1875.

WITNESSES
Robert Everitt
Geo. E. Upshall

INVENTOR
Hudson H. C. Arnold,
Chipman Hosmer & Co,
ATTORNEYS

UNITED STATES PATENT OFFICE.

HUDSON H. C. ARNOLD, OF NICHOLAUSVILLE, KENTUCKY.

IMPROVEMENT IN ANIMAL-TRAPS.

Specification forming part of Letters Patent No. 165,526, dated July 13, 1875; application filed March 20, 1875.

*To all whom it may concern:*

Be it known that I, HUDSON H. C. ARNOLD, of Nicholausville, in the county of Jessamine and State of Kentucky, have invented a new and valuable Improvement in Animal-Traps; and I do hereby declare that the following is a full, clear, and exact description of the construction and operation of the same, reference being had to the annexed drawings making a part of this specification, and to the letters and figures of reference marked thereon.

Figure 1:
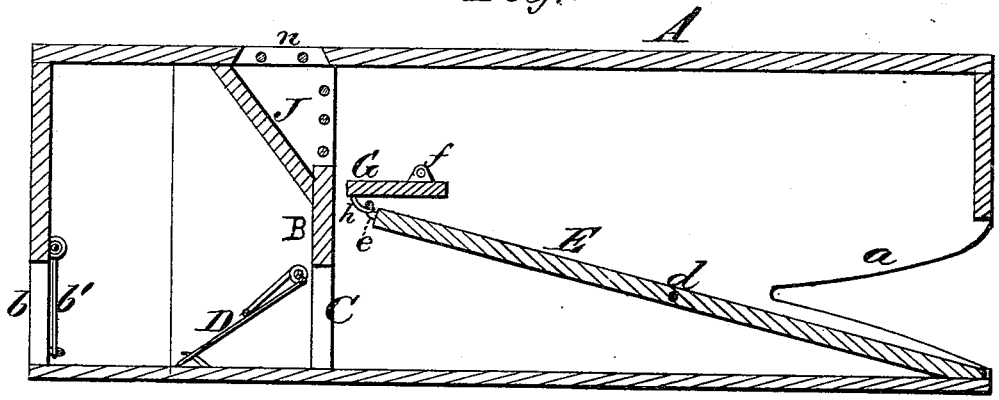
Figure 2:
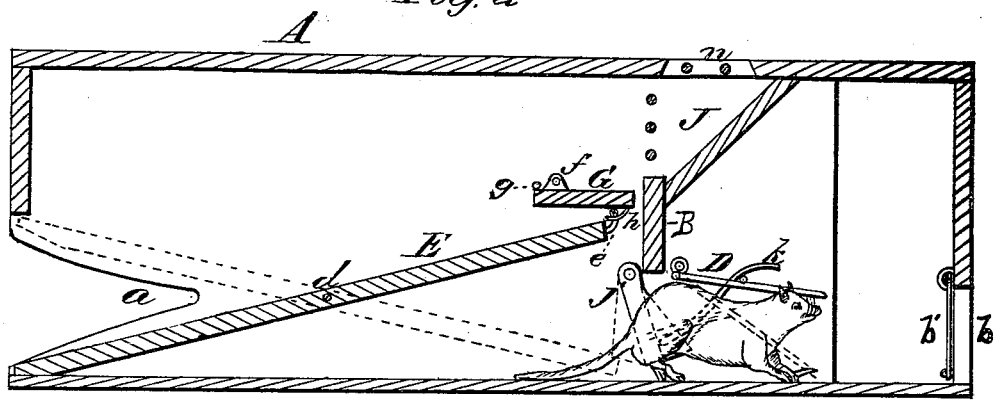
Figure 3:
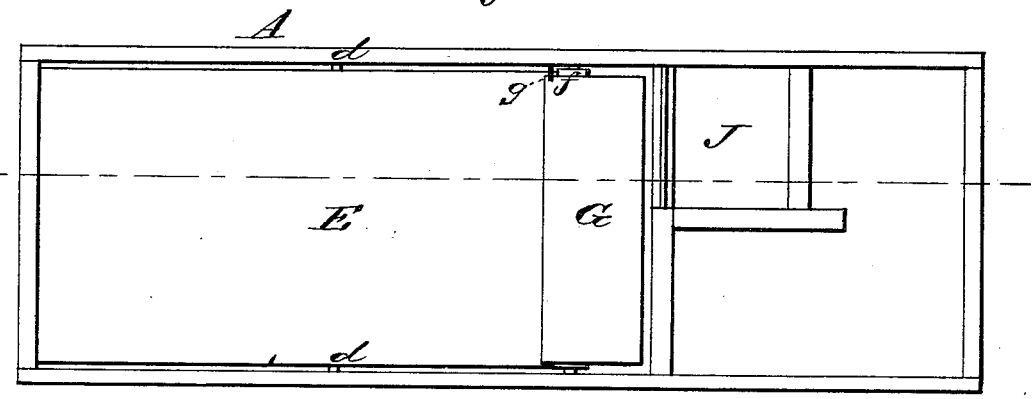

Figures 1 and 2 of the drawing are representations of longitudinal vertical sections of my animal-trap, and Fig. 3 is a plan view of the same.

This invention has relation to self-setting animal-traps; and the nature of my invention consists in combining, with an inclined drop, a swinging gate and a weighted arm for locking the same, as will be hereinafter explained.

In the annexed drawings, A designates an oblong rectangular box having an entrance, $a$, at one end, and an opening, $b$, at the other end for removing the entrapped animals, which opening is guarded by a wire door, $b'$. The box A is divided by a vertical partition, B, into two apartments, and through this partition a passage, C, is made, which is provided with a wire fall, D, that will allow the animals to pass from the larger apartment into the smaller one, but will prevent their return. E designates an inclined drop, which is pivoted at $d$, and provided with a loop, $e$, on one end. That part of the drop which is in front of the pivots $d$ preponderates; consequently the end having the loop $e$ on it will be highest when there is no weight on it. G designates a tripping-board, the ends of which are pivoted to the sides of the box A at $f$, near its front edge, and it is held in a horizontal position by means of a stop, $g$, in front of one of the pivots $f$. On the bottom side of the board G is a catch, $h$, which, when this board is in a horizontal plane, will engage under the loop $e$, and hold the drop E in the inclined position indicated in full lines, Figs. 1 and 2. J designates a bait-box, access to which can be had, for supplying it with bait, through an opening in the top of the box A, which opening is provided with a wire slide, $n$, which admits light to the box J. When an animal ascends the drop E, and steps upon the front part of the board G, this board will tilt and release the drop, thus allowing the animal to fall. He will then pass into the smaller apartment through the opening C. The moment the animal leaves the drop B it will rise and engage itself with the tripping-board catch $h$, thus leaving the trap set for another animal. The wire fall D is caused to drop, after an animal passes beneath it, by its own weight. The weight $j$, with its arm $k$, is operated by the drop E, so as to release the gate D, and allow the animal to pass through. In the normal position of gate D it is held down by the arm $k$, and thus prevented from being raised by the animal in the receptacle.

What I claim as new, and desire to secure by Letters Patent, is—

In an animal-trap the gate D, hinged or pivoted at its upper end, in combination with the swinging weight $j$, the arm $k$, and the tilting platform E, substantially as and for the purpose described.

In testimony that I claim the above I have hereunto subscribed my name in the presence of two witnesses.

HUDSON H. C. ARNOLD.

Witnesses:
T. L. WELCH,
N. DICKERSON.